(12) United States Patent
Boyce et al.

(10) Patent No.: US 8,938,004 B2
(45) Date of Patent: Jan. 20, 2015

(54) DEPENDENCY PARAMETER SET FOR SCALABLE VIDEO CODING

(75) Inventors: Jill Boyce, Manalapan, NJ (US); Danny Hong, New York, NY (US); Stephan Wenger, Hillsborough, CA (US)

(73) Assignee: Vidyo, Inc., Hackensack, NJ (US)

( * ) Notice: Subject to any disclaimer, the term of this patent is extended or adjusted under 35 U.S.C. 154(b) by 123 days.

(21) Appl. No.: 13/539,900

(22) Filed: Jul. 2, 2012

(65) Prior Publication Data

US 2012/0275517 A1 Nov. 1, 2012

Related U.S. Application Data

(63) Continuation of application No. 13/414,075, filed on Mar. 7, 2012, now abandoned.

(60) Provisional application No. 61/451,454, filed on Mar. 10, 2011.

(51) Int. Cl.
*H04N 11/02* (2006.01)

(52) U.S. Cl.
CPC .............. *H04N 19/30* (2014.11); *H04N 19/70* (2014.11); *H04N 19/597* (2014.11); *H04N 19/46* (2014.11)
USPC .................................................. 375/240.12

(58) Field of Classification Search
CPC .......... H04N 7/26547; H04N 7/26686; H04N 7/26691; H04N 7/26696; H04N 19/00418; H04N 19/00424; H04N 19/00442; H04N 19/00448
See application file for complete search history.

(56) References Cited

U.S. PATENT DOCUMENTS

| | | |
|---|---|---|
| 4,958,226 A | 9/1990 | Haskell et al. |
| 5,136,377 A | 8/1992 | Johnston et al. |
| 5,227,878 A | 7/1993 | Puri et al. |
| 5,500,678 A | 3/1996 | Puri |
| 5,563,593 A | 10/1996 | Puri |
| 6,014,694 A | 1/2000 | Aharoni et al. |
| 6,085,252 A | 7/2000 | Zhu et al. |
| 6,097,697 A | 8/2000 | Yao et al. |
| 6,496,217 B1 | 12/2002 | Piotrowski |
| 6,643,496 B1 | 11/2003 | Shimoyama et al. |
| 7,012,893 B2 | 3/2006 | Bahadiroglu |

(Continued)

FOREIGN PATENT DOCUMENTS

| | | |
|---|---|---|
| EP | 1 445 958 | 8/2004 |
| JP | H09-116903 | 5/1997 |

(Continued)

OTHER PUBLICATIONS

International Search Report and Written Opinion for PCT/US2012/028032, dated May 30, 2012.

(Continued)

*Primary Examiner* — Christopher S Kelley
*Assistant Examiner* — Christopher Findley
(74) *Attorney, Agent, or Firm* — Baker Botts, L.L.P.

(57) ABSTRACT

System and methods for video decoding include receiving at least one Dependency Parameter Set (DPS); and determining at least one inter-layer dependency based on the received DPS. Systems and methods for video encoding include selecting a layering structure; encoding at least one Dependency Parameter Set (DPS) including a representation of the layering structure in a binary format; and including the encoded DPS in a bitstream or sending the encoded DPS out of band.

24 Claims, 6 Drawing Sheets

(56) References Cited

U.S. PATENT DOCUMENTS

| | | | |
|---|---|---|---|
| 7,295,520 B2 | 11/2007 | Lee et al. | |
| 7,342,880 B2 | 3/2008 | Yanagihara et al. | |
| 7,542,435 B2 | 6/2009 | Leon et al. | |
| 7,593,032 B2 | 9/2009 | Civanlar et al. | |
| 7,593,339 B2 | 9/2009 | Shoemaker et al. | |
| 7,701,851 B2 | 4/2010 | Chakareski et al. | |
| 7,817,625 B2 | 10/2010 | Jefremov | |
| 7,933,294 B2 | 4/2011 | Chakareski et al. | |
| 7,948,886 B2 | 5/2011 | Chakareski et al. | |
| 8,126,054 B2 | 2/2012 | Hsiang | |
| 8,289,370 B2 | 10/2012 | Civanlar et al. | |
| 8,649,441 B2 | 2/2014 | Hong et al. | |
| 8,699,522 B2 | 4/2014 | Chakareski et al. | |
| 2002/0136162 A1 | 9/2002 | Yoshimura et al. | |
| 2003/0086622 A1 | 5/2003 | Gunnewiek et al. | |
| 2004/0086041 A1 | 5/2004 | Ye et al. | |
| 2004/0114817 A1 | 6/2004 | Jayant et al. | |
| 2004/0170395 A1 | 9/2004 | Filippini et al. | |
| 2004/0252758 A1 | 12/2004 | Katsavounidis | |
| 2004/0252900 A1 | 12/2004 | Bruls | |
| 2005/0058065 A1 | 3/2005 | Tiller et al. | |
| 2005/0163211 A1 | 7/2005 | Shanableh | |
| 2006/0023748 A1 | 2/2006 | Chandhok et al. | |
| 2006/0224763 A1 | 10/2006 | Altunbasak et al. | |
| 2007/0005804 A1 | 1/2007 | Rideout | |
| 2007/0086516 A1 | 4/2007 | Lee et al. | |
| 2007/0110152 A1 | 5/2007 | Lee et al. | |
| 2007/0133405 A1 | 6/2007 | Bowra et al. | |
| 2008/0007438 A1 | 1/2008 | Segali et al. | |
| 2008/0089411 A1* | 4/2008 | Wenger et al. | 375/240.12 |
| 2008/0089428 A1 | 4/2008 | Nakamura et al. | |
| 2008/0137753 A1 | 6/2008 | He | |
| 2009/0116562 A1 | 5/2009 | Eleftheriadis et al. | |
| 2009/0252220 A1 | 10/2009 | Choi et al. | |
| 2010/0020871 A1 | 1/2010 | Hannuksela et al. | |
| 2010/0067581 A1 | 3/2010 | Hong et al. | |
| 2010/0098157 A1 | 4/2010 | Yang | |
| 2010/0150232 A1 | 6/2010 | Nguyen et al. | |
| 2010/0158116 A1 | 6/2010 | Jeon et al. | |
| 2010/0172409 A1 | 7/2010 | Reznik et al. | |
| 2010/0189182 A1 | 7/2010 | Hannuksela et al. | |
| 2010/0195738 A1 | 8/2010 | Zhu et al. | |
| 2011/0013701 A1 | 1/2011 | Henocq et al. | |
| 2011/0134994 A1 | 6/2011 | Lu et al. | |
| 2011/0182353 A1 | 7/2011 | Bae | |
| 2012/0050475 A1 | 3/2012 | Tian et al. | |
| 2012/0075436 A1 | 3/2012 | Chen et al. | |
| 2012/0183077 A1 | 7/2012 | Hong et al. | |
| 2012/0230431 A1 | 9/2012 | Boyce et al. | |
| 2012/0269275 A1 | 10/2012 | Hannuksela et al. | |
| 2012/0269276 A1 | 10/2012 | Hong et al. | |
| 2012/0275517 A1 | 11/2012 | Boyce et al. | |
| 2013/0016776 A1 | 1/2013 | Boyce et al. | |
| 2013/0201279 A1 | 8/2013 | Civanlar et al. | |

FOREIGN PATENT DOCUMENTS

| | | |
|---|---|---|
| JP | 2000-295608 | 10/2000 |
| JP | 2005-167962 | 6/2005 |
| WO | WO 03/063505 | 7/2003 |
| WO | WO 2004/036916 | 4/2004 |
| WO | WO 2004/040917 | 5/2004 |
| WO | WO 2004/043071 | 5/2004 |
| WO | WO 2004/098196 | 11/2004 |
| WO | WO 2008/007792 | 1/2008 |
| WO | WO 2008/008133 | 1/2008 |
| WO | WO 2008/051380 | 5/2008 |
| WO | WO 2008/130500 | 10/2008 |
| WO | WO 2010/0126613 A2 * 11/2010 | H04N 7/26 |

OTHER PUBLICATIONS

International Search Report and Written Opinion for PCT/US2012/020809, dated Mar. 21, 2012.

ITU-T Recommendation H.264, "Advanced video coding for generic audiovisual services", 564 pages (Nov. 2007).

U.S. Appl. No. 13/414,075, Dec. 13, 2012 Non-Final Office Action.

Wiegand, et al., "Overview of the H.264/AVC Video Coding Standard", *IEEE Transaction of Circuits and System for Video Technology*, 13(7):560-576 (2003).

Boyce et al., "Extensible High Layer Syntax for Scalability", Joint Collborative Team on Video Coding(JCT-VC) of ITU-T SG16 WP3 and ISO/IEC JTC1/SC29/WG11; $5^{th}$ Meeting: Geneva, CH, Mar. 16-23, 2011 (JCTVC-E279) (10 pages).

Schwarz et al., "Overview of the Scalable Extension of the H.264/MPEG-4 AVC Video Coding Standard", JVT Meeting; 78. MPEG Meeting; Oct. 20-27, 2006; (Joint Video Team of ISO/IEC JTC1/SC29/WG11 and ITU-T SG16) No. JVT-U145 (20 pages).

European Extended Search Report for EP Application No. 12754488, dated Sep. 2, 2014.

International Search Report and Written Opinion for PCT/US2012/043251, dated Sep. 18, 2012 (Corresponds to U.S. Appl. No. 13/528,010).

International Search Report and Written Opinion for PCT/US2013/059730, dated Jan. 3, 2014.

International Search Report and Written Opinion—PCT/US06/028365 (International Filing Date: Jul. 21, 2006).

European Extended Search Report for EP 06788106, dated Oct. 18, 2012 (Corresponds to U.S. Appl. No. 13/621,714).

Blake, et al., "RFC 2475: An Architecture for Differentiated Services", Internet Citation, Dec. 1998, XP002220520; Retrieved from the Internet: URL:ftp.//ftp.isi.edu/in-notes/rfc2475.txt [retrieved on Nov. 11, 2002].

"H.263+(or H.263 version 2), Video Coding for Low Bitrate Communication", Sep. 2, 1998, No. H.263, Version 2, Feb. 9, 1998, XP030001506.

Eleftheriadis, et al., "Multipoint videoconferencing with scalable video coding", Journal of Zhejiang University Science A; An International Applied Physics & Engineering Journal, Springer, Berlin, DE, 7(5):696-705 (May 1, 2006), XP019385029.

Jia, Jie "error Resilience for SVC base and enhanced layers" *Joint Video Team (JVT) of ISO/IEC MPEG & ITU-T VCEG, 15ht Meeting*: Busan, KR, Apr. 16-22, 2005 (JVT-0048) (23 pages).

Jinzenji, et al., "Scalable Video Conference System Using MPEG-4 ASP/FGS Software Codecs", Japan, *The Institute of Electronics, Information and Communication Engineers*, 104(752):55-60 (2005) (English Abstract only).

Kirenko, et al., "Flexible Scalable Video Compression", 69. MPEG Meeting; Jul. 19, 2004-Jul. 23, 2004; Redmond; (Motion Picture Expert Group of ISO/IEC JTC1/SC29/WG11), No. M10997, Jul. 14, 2004, XP030039776.

Reichel, et al., "Joint Scalable Video Model (JSVM) 3.0 Reference Encoding Algorith Description", 73. MPEG Meeting; Jul. 25, 2005-Jul. 29, 2005; Poznan, Poland; (Motion Picture Expert Group or ISO/IEC JTC1/SC29/WG11), No. N7311, Sep. 6, 2005, XP030013911.

S. Wenger, "Video Redundancy Coding in H.263+", Workshop on Audio-Visual Services for Packet Networks (aka Packet Video Workshop), 1997, 6 pages.

Wang, et al., "System and Transports Interface of SVC", *IEEE Transactions Circuits and Systems for Video Technology*, 17(9):1149-1163, (2007).

* cited by examiner

402 dep_parameter_set_id identifies the dependency parameter set. The value of dep_parameter_set_id shall be in the range of 0 to 3, inclusive.

403 scalability_flag equal to 1 specifies that multiple spatial and/or quality layers may be present. scalability_flag equal to 0 specifies that only a single spatial layer and single quality layer is present.

404 max_spatial_layers_minus1 + 1 specifies the maximum number of spatial layers that may be present. max_spatial_layers_minus1 shall be in the range of 0 to 7, inclusive.

405 dependency_flag[ i ] specifies whether inter-layer prediction from the highest quality layer of the coded sequence with spatial_id equal to i may be used for decoding the coded slice with spatial_id equal to i + 1. If dependency_flag[ i ] is equal to 1, inter-layer prediction may be used. If dependency_flag[ i ] is equal to 0, inter-layer prediction may not be used.

410 ref_id[ i ] indicates the spatial_id of the layer the subject layer directly depends on.

406 max_quality_layers_minus_1 + 1 specifies the maximum number of quality layers that may be present for the spatial layer with spatial_id equal to i. max_quality_layers_minus_1 shall be in the range of 0 to 15, inclusive.

407 multiview_flag shall be equal to 0.

408 dps_vui_parameters_present_flag shall be equal to 0.

409 extension_flag shall be equal to 0.

Figure 4

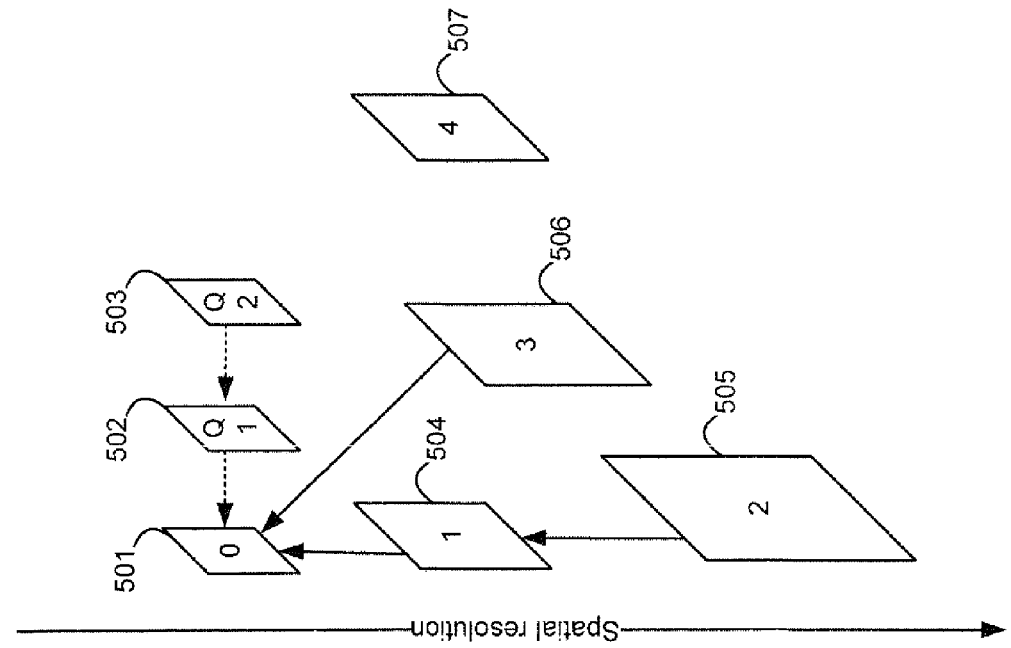

FIG. 6

| Syntax Element | Value |
|---|---|
| dep_parameter_set_id | 0 |
| scalability_flag | 1 |
| if( scalability_flag ) { | |
| max_spatial_layers_minus1 | 4 |
| for( spatialID = 0; spatialID <= 4; spatialID++ ) { | |
| dependency_flag[ 0 ] | 0 |
| ref_id[ 0 ] // note: if() syntax omitted | (not present) |
| max_quality_layers_minus1[ 0 ] | 2 |
| dependency_flag[ 1 ] | 1 |
| ref_id[ 1 ] | 0 |
| max_quality_layers_minus1[ 1 ] | 0 |
| dependency_flag[ 2 ] | 1 |
| ref_id[ 2 ] | 1 |
| max_quality_layers_minus1[ 2 ] | 0 |
| dependency_flag[ 3 ] | 1 |
| ref_id[3] | 0 |
| max_quality_layers_minus1[ 3 ] | 0 |
| dependency_flag[ 4 ] | 0 |
| ref_id[ 4 ] | (not present) |
| max_quality_layers_minus1[ 4 ] | 0 |
| } | |
| multiview_flag | 0 |
| dps_vui_parameters_present_flag | 0 |
| extension_flag | 0 |

FIG. 5

DEPENDENCY PARAMETER SET FOR SCALABLE VIDEO CODING

PRIORITY CLAIM

This application is a continuation of U.S. patent application Ser. No. 13/414,075 filed Mar. 7, 2012 which claims priority to U.S. Provisional Application Ser. No. 61/451,454, titled "Dependency Parameter Set For Scalable Video Coding," filed Mar. 10, 2011, the disclosures of each are hereby incorporated by reference in its entirety.

FIELD

The present application relates to video coding, and more specifically, to the representation of information related to layered association of video sequences in a parameter set.

BACKGROUND

Scalable video coding refers to techniques where a base layer is augmented by one or more enhancement layers. When base and enhancement layer(s) are reconstructed jointly, the reproduced video quality can be higher than if the base layer is reconstructed in isolation.

Multiview coding refers to techniques where more than one "view" is coded in its own video sequence, and the combined decoding of both sequences (in conjunction with appropriate rendering) can offer a stereoscopic or other 3D-type viewing effect.

There can be other forms of coding techniques where the association and/or relationship of several video sequences is important for joint decoding and/or rendering, for example multiple description coding.

In the following, the description refers to scalable coding for convenience.

In scalable video coding, many forms of enhancement layer types have been reported, including temporal enhancement layers (that increase the frame rate), spatial enhancement layers (that increase the spatial resolution), and SNR enhancement layers (that increase the fidelity, that can be measured in a Signal to Noise SNR ratio).

Referring to FIG. 1, in scalable video coding, the relationship of layers can be depicted in the form of a directed graph. In the example presented, a base layer (101) (that can be, for example, be in CIF format at 15 fps) can be augmented by a temporal enhancement layer (102) (that can, for example increase the frame rate to 30 fps). Also available can be a spatial enhancement layer (103) that increases the spatial resolution from CIF to 4CIF. Based on this spatial enhancement layer (103), another temporal enhancement layer can increase the frame rate to 30 fps.

In order to reconstruct a 4CIF, 30 fps signal, all base layer (101), spatial enhancement layer (103), and second temporal enhancement layer (104) should be present. Other combinations are also possible, as indicated in the graph.

Layering structure information can be useful in conjunction with network elements that remove certain layers in response to network conditions. Referring to FIG. 2, shown is a sending endpoint (201) which sends a scalable video stream (that may have a structure as described before) to an application layer router (202). The application layer router can omit forwarding certain layers to endpoints (203), (204), based on its knowledge of the endpoints' capabilities, network conditions, and so on. U.S. Pat. No. 7,593,032, incorporated herein by reference in its entirety, describes exemplary techniques that can be used for the router.

The information in each layer can be coded according to ITU-T Rec. H.264, "Advanced video coding for generic audiovisual services", March 2010, available from the International Telecommunication Union ("ITU"), Place de Nations, CH-1211 Geneva 20, Switzerland or http://www.itu.int/rec/T-REC-H.264, and incorporated herein by reference in its entirety, and, more specifically, to H.264's scalable video coding (SVC) extension, or to other video coding technology supporting scalability, such as, for example, the forthcoming scalable extensions to "High Efficiency Video Coding" HEVC, which is at the time of writing in the process of being standardized. At the time of this writing, the current working draft of HEVC can be found in Bross et. al, "High Efficiency Video Coding (HEVC) text specification draft 6" February 2012, available from http://phenix.it-sudparis.eu/jct/doc_end_user/documents/8_San %20Jose/wg11/JCTVC-H1003-v21.zip.

According to H.264, the bits representing each layer are encapsulated in one or more Network Adaptation Layer units (NAL units). Each NAL unit can contain a header that can indicate the layer the NAL unit belongs to.

However, without observing multiple NAL units belonging to each and every one of the layers, analyzing their content, and, thereby, building a "picture" of the layers available, a router lacks mechanism to derive the layering structure as described above. Without knowledge of the layering structure, a router may not make sensible choices for removing NAL units belonging to certain layers.

This situation was identified during the development of SVC, and an SEI message was introduced that describes the layering structure. SEI messages can have the disadvantage that network elements, according to H.264, have the freedom to remove them from the bitstream, as they are not required for the decoding process. If an intermediate network element (205), depicted here in dashed lines, were to remove the SEI messages, the router may not quickly obtain the layering structure and would have to fall back to observing all NAL units and their content.

Although not critical, the layering structure should be known before the first bit containing video information arrives at the router. The SVC payload format for SVC, (Wenger, Wang, Schierl, Eleftheriadis, "RTP Payload Format for Scalable Video Coding", RFC 6190, available from http://tools.ietf.org/html/rfc6190), incorporated by reference herein in its entirety, includes a mechanism to integrate the SEI message containing the layering structure in the capability exchange messages, for example using the Session Initiation Protocol (Rosenberg et. al., "SIP: Session Initiation Protocol" RFC 3261, available from http://tools.ietf.org/html/rfc3261) and incorporated by reference herein in its entirety. However, decoding an SEI message requires bit oriented processing of video syntax, something a router is not often prepared to do. Further, intercepting the SEI message coded as part of the session signaling (in contrast to being coded in the bitstream) generally requires the router to be in the signaling pass, which, for some routers, may not be a sensible, cost-effective option.

Accordingly, there is a need for a data structure that does a) not require difficult bit oriented processing, b) is available, as part of the video bitstream, early in the bitstream transmission, and c) cannot be removed by an intermediary network element without making the video bitstream non-compliant.

SUMMARY

The disclosed subject matter provides for a Dependency Parameter Set (DPS), that collects information pertaining to the scalable bitstream, including a binary form of the directed graph already described, Visual Usability Information (VUI) pertaining to all layers of the scalable bitstream, and extension mechanisms to allow easy extensibility to future video coding mechanisms. The DPS can share the characteristics of other parameter sets; for example, it can be sent in band or out of band, and it can be referenced, directly or indirectly, from other parameter sets, the slice header, or other appropriate syntax elements such as, for example, an access unit delimiter or access unit/picture header.

In one embodiment, a Dependency Parameter Set can be part of a video bitstream.

In the same or another embodiment, the DPS can be sent out of band, for example as part of a capability exchange.

In the same or another embodiment, the DPS can include an ID, that allows for the selection of a storage location in a table of DPSs.

In the same or another embodiment, the DPS can include a flag indicating the presence of scalability information as sent by the original sender.

In the same or another embodiment, the binary information about the layering structure can be arranged by layers, wherein for each layer there is one layer description.

In the same or another embodiment, the scalability information can include an indication of the numbers of layers being described.

Each layer description can contain a flag (dependency_flag) indicating a layer being dependent or independent, and a reference to another layer (ref_id) upon which the layer directly depends on.

In the same or another embodiment, the layers can be spatial, quality, or temporal layers.

In the same or another embodiment, the scalability information for a spatial layer can contain a number of quality layers for at least one spatial layer.

In the same or another embodiment, the DPS can include an optional part describing structures pertaining to multiview (that can be empty), the presence of which can be indicated by a flag In the same or another embodiment, the DPS can include an optional part describing visual usability information (VIU), that can be empty, and the presence of which can be indicated by a flag.

In the same or another embodiment, the DPS can include an extension mechanism using a flag.

BRIEF DESCRIPTION OF THE DRAWINGS

Further features, the nature, and various advantages of the disclosed subject matter will be more apparent from the following detailed description of the preferred embodiments and the accompanying drawings in which:

FIG. 4 is a schematic illustration of exemplary representations of the video bitstream in FIG. 3 in accordance with an embodiment of the present disclosed subject matter;

FIG. 5 is a schematic illustration of a layering structure;

FIG. 6 is a schematic illustration of a Dependency Parameter Set representing the layering structure of FIG. 5.

Figure 1:
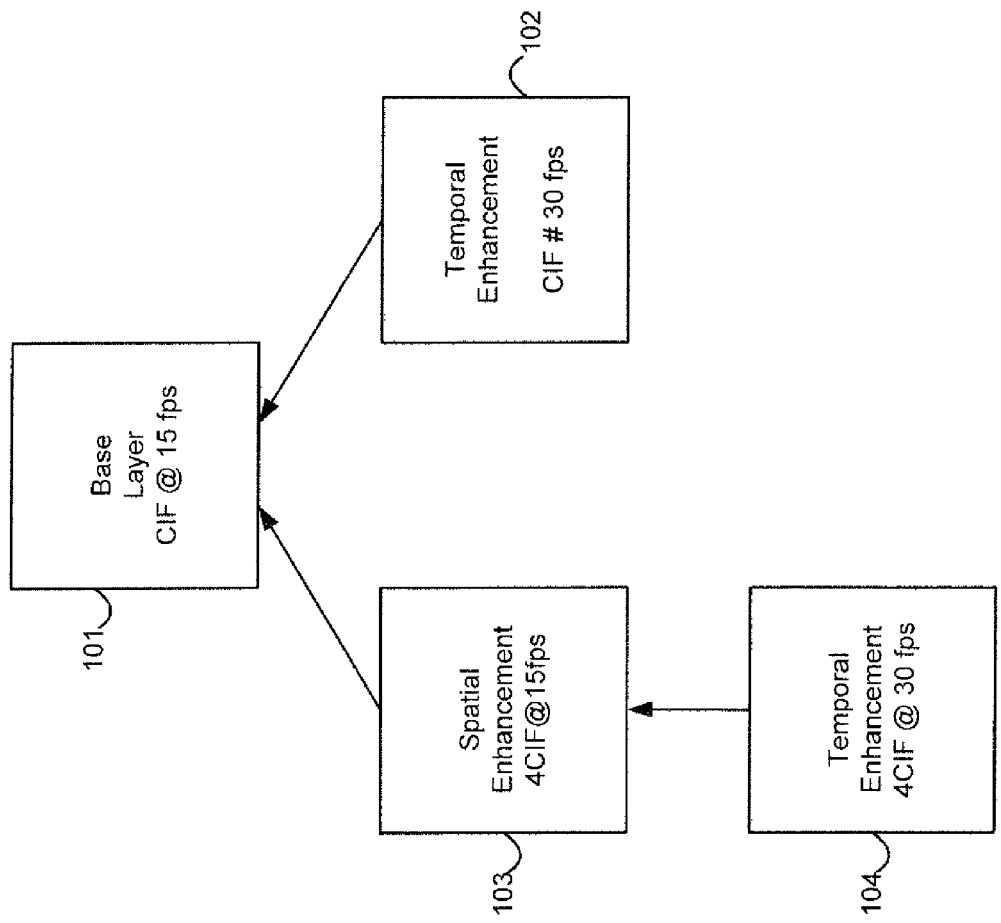
FIG. 1 is a schematic illustration of a layering structure of a layered bitstream in accordance with Prior Art.
Figure 2:
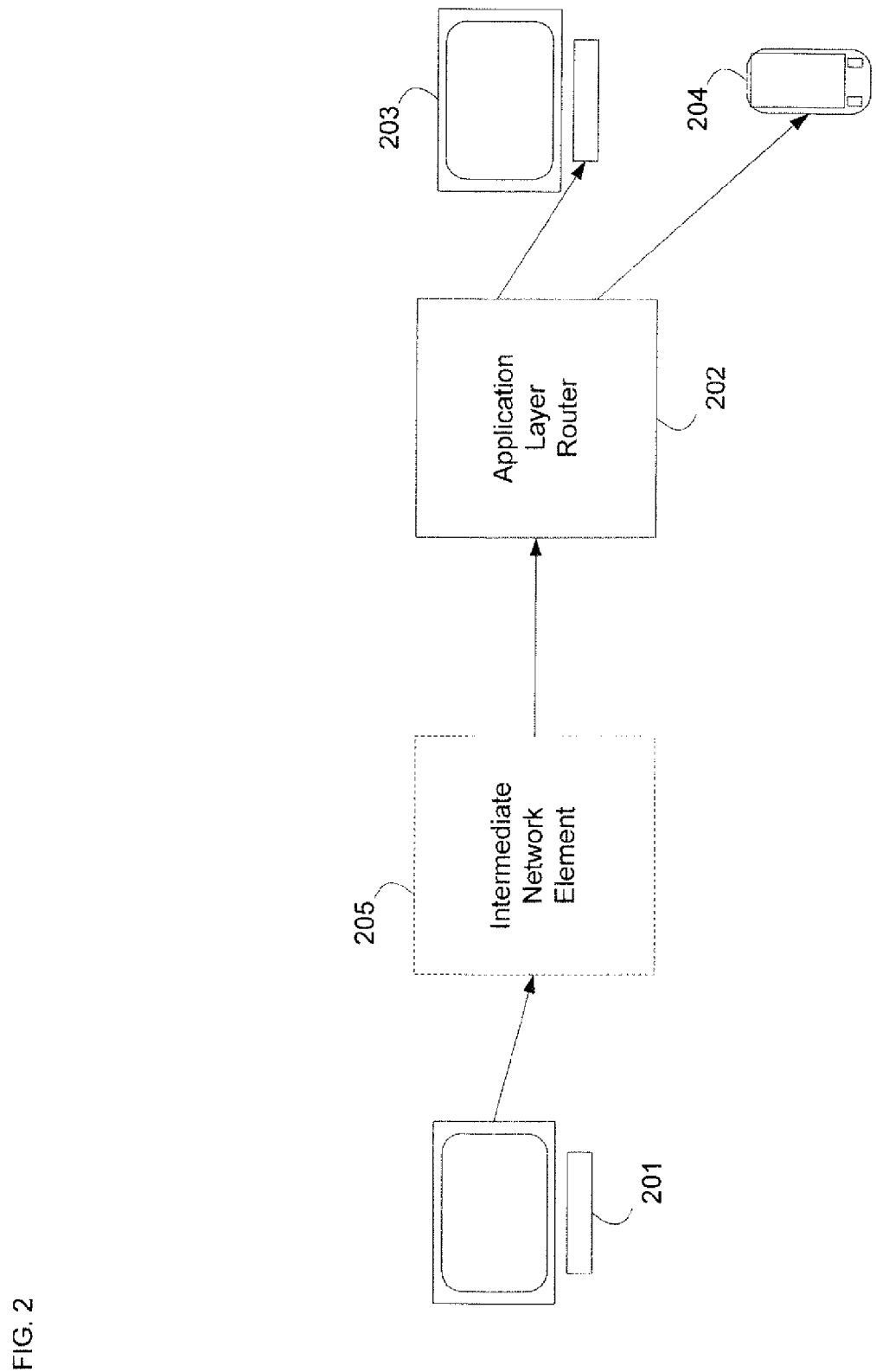
FIG. 2 is a schematic illustration of a system using layered video coding.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

The disclosed subject matter provides for a Dependency Parameter Set (DPS), that collects information pertaining to the scalable bitstream, including a binary representation of the layer structure, Visual Usability Information (VUI) pertaining to all layers of the scalable bitstream, and extension mechanisms to allow extensibility to future video coding mechanisms. The DPS can share the characteristics of other parameter sets; for example, it can be send in band or out of band, and it can be referenced, directly or indirectly, from other parameter sets, the slice header, or other appropriate syntax elements such as, for example, an access unit delimiter or access unit/picture header.

Figure 3:
FIG. 3 is a schematic illustration of a video bitstream in accordance with an embodiment of the present disclosed subject matter.

FIG. 3 shows a syntax diagram, following the conventions described in ITU-T Rec. H.264, of a Dependency Parameter Set (DPS) (301) in accordance with an embodiment of the disclosed subject matter.

FIG. 4 shows a semantics definition, following the conventions described in ITU-T Rec. H.264, of a DPS (401) in accordance with an embodiment of the disclosed subject matter.

In one exemplary embodiment of the invention, the dependency parameter set can include a Dependency Parameter Set Identification dep_parameter_set_id (302) (402). The dep_parameter_set_id can identify the dependency parameter set that is referred to, for example, by a sequence parameter set, NAL unit header, Access Unit Delimiter, picture or slice header, or other high level syntax structure. The value of dep_parameter_set_id can, for example, be in the range of 0 to 2, inclusive. The dep_parameter_set_id can be used, for example, during the activation process of the dependency parameter set (which can be similar to the activation processes of other parameter sets as described in ITU-T Rec. H.264), and/or to identify a storage location in a dependency parameter set table, which according to the same or another embodiment can have three entries. The fourth value that can be represented in two bits can be reserved for future extensions.

In the same or another embodiment, a DPS can include a scalability_flag (303) (403) that, when equal to 1 can specify that at least one spatial and/or quality layer may be present. The scalability_flag equal to 0 can specify that only a single spatial layer and single quality layer is present (i.e. the bitstream is not scalable except perhaps for temporal scalability which, in H.264, is a functionality available without the scalable extension). A side effect of this flag can be that information pertaining to scalability information is not present when the flag is set to zero.

In an embodiment, a DPS can include a fixed or variable length codeword representing max_spatial_layers_minus1 (304) (404), which can specify the maximum number of spatial layers that may be present in the scalable bitstream, max_spatial_layers_minus1 can be in the range of 0 to 7, inclusive. Shown in FIG. 3 is an unsigned fixed length codeword of 3 bits (indicated by u(3)), which is sufficient to represent a range of 0 to 7.

In the same or another embodiment, a DPS can include one or more dependency flags dependency_flag[i] (305) (405) that can specify whether inter-layer prediction from the coded sequence with lower values of spatial_id may be used for decoding the coded slice with spatial_id equal to i+1, where spatial_id can identify the spatial layer, similar to the dependency_id syntax element in the NAL unit header of SVC. If dependency_flag[i] is equal to 1, inter-layer prediction may be used. If dependency_flag[i] is equal to 0, inter-layer prediction may not be used and the spatial layer can be decoded without reference to other spatial layers, e.g., it is an "independent layer".

In the same or another embodiment, a DPS can include one or more identifications of a reference layer (ref_id[i]) (310) (410). ref_id[i] can indicate the layer which may be used directly by inter-layer prediction from slices of the layer i (this is described in more detail in the example below). The presence of ref_id can be dependent on the value of the dependency_flag[i], for example such that ref_id[i] is present only if dependency_flag[i] is set to 1 (311). (There is little value in signaling a reference layer for a target layer if the target layer is independent.) Ref_id can be coded, for example, as an integer representing the layer which may be used directly by inter-layer prediction, or as an integer representing the difference between i and the integer representing the layer which may be used directly by inter-layer prediction.

In the same or another embodiment, a DPS can include, for example for each spatial layer, a fixed or variable length codeword indicating a max_quality_layers_minus_1+1 (306) (406), which can specify the maximum number of quality layers that may be present. max_quality_layers_minus_1 can be in the range of 0 to 15, inclusive.

It should be noted here that the syntax of the DPS, as described, can limit the flexibility of a layering structure such that a spatial layer cannot be dependent on a quality layer. In H.264 and SVC, such a limitation can be a sensible restriction. However, a person skilled in the art can readily modify the disclosed DPS syntax to allow for greater flexibility if so desired. For example, the information related to one layer (inside the loop (312)) can contain information about the type of the layer (for example: spatial, quality, temporal), and an entry of the loop could be present for each temporal, spatial and quality layer. Such a representation can be more flexible as any layer of any layer type can be dependent on another layer of any layer type, but less compact than the representation as shown in FIGS. 3 and 4. The disclosed subject matter contemplates such modifications.

In the same or another embodiment, a DPS can include a multiview_flag (307) (407) that can be equal to 0 if no multiview information is present, and can be 1 if multiview information is present. The multiview_flag is included in the disclosed subject matter because it appears likely that future video coding standards, such as HEVC, will include multiview extensions. While the disclosed subject matter does not present specific details regarding the nature of those extensions, it does envision the need to place syntax elements pertaining to such extensions in a data structure like the DPS.

In the same or another embodiment, a DPS can include a dps_vui_parameters_present_flag (308) (408) that can be equal to 0 if no DPS-level Visual Usability Information is present, and can be 1 when such information is present. In H.264, video usability information is an optional part of the sequence parameter set and covers information such as the pixel aspect ratio, overscan information, a description of the video signal type (including, among other things, the color characteristics such as the color primaries and the transfer characteristics), information pertaining to the chroma sampling structure, information related to the (fixed) frame rate, and information related to restrictions in the flexibility of the bitstream use by the encoder (such as, for example, length of motion vectors). Some of these parameters are clearly layer dependent and may advantageously continue to reside in a parameter set that is "per layer", such as the sequence parameter set. However, some of the aforementioned information may be required to be the same for all layers. Such information can be placed in a dependency parameter set VUI. The disclosed subject matter envisions the need to place syntax elements pertaining to one or more DPS-VUIs in a data structure like the DPS.

In the same or another embodiment, a DPS can include, advantageously at the end, an extension_flag (309) (409), which can be equal to 0 if no extension is present and 1 if an extension is present. The lack of an extension mechanism in H.264 (2003) for parameter sets can lead to unnatural and/or limiting work-arounds to enable functionality (often using SEI messages incurring certain disadvantages, mentioned above) so to preserve backward-compatibility. To henceforth avoid such work-arounds, a DPS should include a provision for an extension mechanism even if the precise nature of the extensions is yet undefined.

Referring to FIGS. 5 and 6, shown is an exemplary layer structure and its representation in the form of a dependency parameter set, respectively. In the example, a coded video sequence contains five spatial layers. Also included are two quality layers. The exemplary dependency parameter set has an id value of 0 (612), and includes information about scalable layers, which means that the scalability flag (613) is set to 1.

Each layer can contain a number of coded slices, forming coded pictures. Therefore, when henceforth referring to a first layer being dependent on a second layer, that means that at least one slice of the first layer can have a direct or indirect inter-layer prediction relationship from one or more slices of the second layer. In contrast, a first layer being referred to as independent from a second layer means that no slice of the first layer has inter-layer prediction dependency to any slice of the second layer, implying that the independent layer can be decoded without information of the second layer being regarded in the decoding process.

Layer 0 (501) is independent from all other layers, and, therefore, its dependency_flag (601) is 0. Accordingly, its ref_id (602) (used to refer to any layer this layer depends on) may not be present in the bitstream. This is reflected in the syntax diagram of FIG. 3 by the if ( ) statement that makes the presence of ref_id dependent on the value of the dependency_flag.

Layer 0 has two dependent quality layers, denoted Q1 (502) and Q2 (503). The possible presence of NAL units belonging to these quality layers in the bitstream can be indicated in the DPS by setting max_quality_layers_minus_1 to 2 (603).

Layer 1 (504) is dependent on layer 0 (501). Therefore, layer 1's dependency_flag (604) is set to 1, and its ref_id (605) is set to 0 to indicate a dependency to layer 0. As layer 1 has no quality enhancement layers, its max_quality_layers_minus_1 (606) is set to 0.

Layer 2 (505) depends directly on layer 1 (504), and indirectly on layer 0 (501). It dependency_flag (607) reflects this dependency by being set to 1, and ref_id (608) refers to layer 1 is the layer to which a direct interlayer dependency is present.

Layer 3 (506) depends only on layer 0 (through appropriate settings of its dependency_flag and ref_id. However, it is not identical to layer 1, even if it has the same dependency relationship as layer 1 (which implies the same settings for dependency_flag and ref_id). One difference between layer 1 (504) and layer 3 (506) can be their respective spatial resolution, depicted in FIG. 5 through the different sizes of the parallelograms representing layers 1 and 3.

Layer 4 (507), is independent from all other layers. It is depicted here as having roughly the same spatial resolution as layer 1 (504). Accordingly, the layering structure can include more than one independent (base) layer in the same scalable bitstream. This enables simulcasting of layers 0 and 4 to decoders incapable of decoding bitstreams with inter-layer dependencies—often called non-scalable decoders.

In the example of FIGS. 5 and 6, multiview does not occur, there are no DPS-VUI parameters, and also no DPS extensions. Therefore, the respective flags are zero (609) (610) (611).

It will be understood that in accordance with the disclosed subject matter, the dependency parameter set techniques described herein can be implemented using any suitable combination of hardware and software. For example, an encoder can contain dependency parameter set encoding module that takes its input from application requirements (e.g., bitrate available, camera parameters, cycles available in the encoder), and optionally from a receiver population. (See e.g., U.S. application Ser. No. 13/010,241, filed Jan. 20, 2011, incorporated herein by reference in its entirety). A DPS encoding module can put the DPS in the bitstream. In a decoder, a DPS decoding module can extract DPS from the bitstream and use it as discussed herein. Also, the router can include DPS decoding module, intercept DPS from bitstream or receive it out of band, and use it as discussed herein. The software (i.e., instructions) for implementing and operating the aforementioned rate estimation and control techniques can be provided on computer-readable media, which can include, without limitation, firmware, memory, storage devices, microcontrollers, microprocessors, integrated circuits, ASICs, on-line downloadable media, and other available media.

Computer System

The methods for dependency parameter sets, described above, can be implemented as computer software using computer-readable instructions and physically stored in computer-readable medium. The computer software can be encoded using any suitable computer languages. The software instructions can be executed on various types of computers. For example, FIG. 7 illustrates a computer system 700 suitable for implementing embodiments of the present disclosure.

Figure 7:
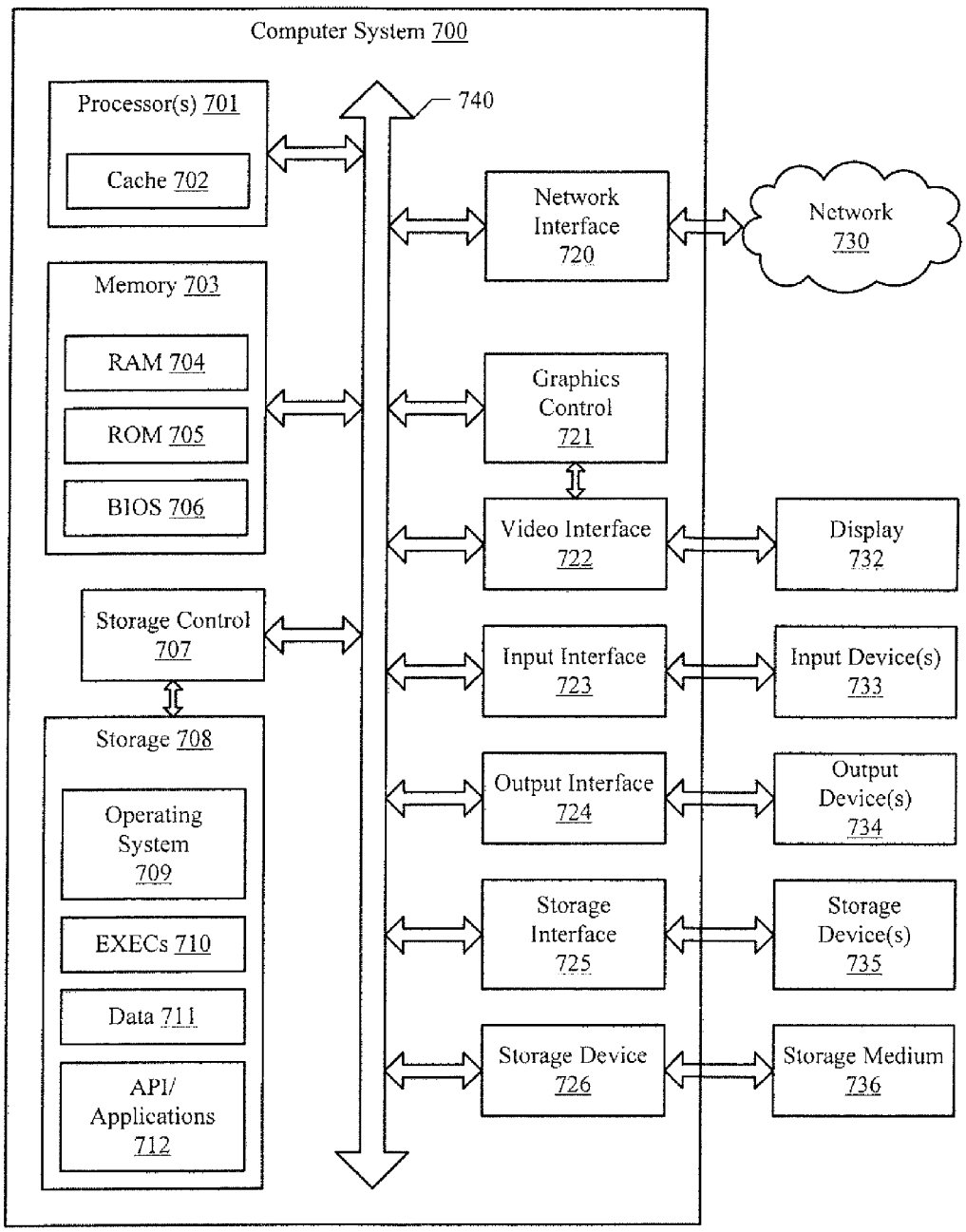
FIG. 7 shows a computer system suitable for implementing an embodiment of the present disclosed subject matter.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 700 can have many physical forms including an integrated circuit, a printed circuit board, a small handheld device (such as a mobile telephone or PDA), a personal computer or a super computer.

Computer system 700 includes a display 732, one or more input devices 733 (e.g., keypad, keyboard, mouse, stylus, etc.), one or more output devices 734 (e.g., speaker), one or more storage devices 735, various types of storage medium 736.

The system bus 740 link a wide variety of subsystems. As understood by those skilled in the art, a "bus" refers to a plurality of digital signal lines serving a common function. The system bus 740 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 701 (also referred to as central processing units, or CPUs) optionally contain a cache memory unit 702 for temporary local storage of instructions, data, or computer addresses. Processor(s) 701 are coupled to storage devices including memory 703. Memory 703 includes random access memory (RAM) 704 and read-only memory (ROM) 705. As is well known in the art, ROM 705 acts to transfer data and instructions uni-directionally to the processor(s) 701, and RAM 704 is used typically to transfer data and instructions in a bi-directional manner. Both of these types of memories can include any suitable of the computer-readable media described below.

A fixed storage 708 is also coupled bi-directionally to the processor(s) 701, optionally via a storage control unit 707. It provides additional data storage capacity and can also include any of the computer-readable media described below. Storage 708 can be used to store operating system 709, EXECs 710, application programs 712, data 711 and the like and is typically a secondary storage medium (such as a hard disk) that is slower than primary storage. It should be appreciated that the information retained within storage 708, can, in appropriate cases, be incorporated in standard fashion as virtual memory in memory 703.

Processor(s) 701 is also coupled to a variety of interfaces such as graphics control 721, video interface 722, input interface 723, output interface 724, storage interface 725, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 701 can be coupled to another computer or telecommunications network 730 using network interface 720. With such a network interface 720, it is contemplated that the CPU 701 might receive information from the network 730, or might output information to the network in the course of performing the above-described method. Furthermore, method embodiments of the present disclosure can execute solely upon CPU 701 or can execute over a network 730 such as the Internet in conjunction with a remote CPU 701 that shares a portion of the processing.

According to various embodiments, when in a network environment, i.e., when computer system 700 is connected to network 730, computer system 700 can communicate with other devices that are also connected to network 730. Communications can be sent to and from computer system 700 via network interface 720. For example, incoming communications, such as a request or a response from another device, in the form of one or more packets, can be received from network 730 at network interface 720 and stored in selected sections in memory 703 for processing. Outgoing communications, such as a request or a response to another device, again in the form of one or more packets, can also be stored in selected sections in memory 703 and sent out to network 730 at network interface 720. Processor(s) 701 can access these communication packets stored in memory 703 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 700 can provide functionality as a result of processor(s) 701 executing software embodied in one or more tangible, computer-readable media, such as memory 703. The software implementing various embodiments of the present disclosure can be stored in memory 703 and executed by processor(s) 701. A computer-readable medium can include one or more memory devices, according to particular needs. Memory 703 can read the software from one or more other computer-readable media, such as mass storage device(s) 735 or from one or more other sources via communication interface. The software can cause processor(s) 701 to execute particular processes or particular parts of particular processes described herein, including defining data structures stored in memory 703 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

We claim:

1. A method for video decoding, comprising:
   receiving at least one Dependency Parameter Set (DPS) including a representation of a layering structure pertaining to a plurality of coded video sequences, wherein at least one of the plurality of coded video sequences is coded in a layered format;
   wherein the representation of the layering structure comprises a plurality of layer descriptions corresponding to a plurality of layers, each layer description referencable by an index;
   receiving at least one Network Abstraction Layer (NAL) unit including a layer_id value and belonging to a picture belonging to one of the least one of the plurality of coded video sequences; and
   determining at least one inter-layer dependency of the NAL unit based on the received DPS through accessing the layer description by using the layer_id as the index into the plurality of layer descriptions;
   wherein the DPS includes a dependency parameter set id, the dependency parameter set id being referred to from a sequence parameter set (SPS);
   wherein the DPS comprises a raw byte sequence payload (RESP) separate from the SPS or SPS extensions, if any; and
   wherein the DPS is activated once in at least one of the plurality of coded video sequences and pertains to all pictures of the plurality of coded video sequences.

2. The method of claim 1, wherein the DPS further includes a flag indicating a presence of the layering structure in binary form.

3. The method of claim 1, wherein the DPS further includes a flag indicating the presence of a multiview structure.

4. The method of claim 1, wherein the DPS further includes a flag indicating the presence of Visual Usability Information pertaining to a plurality of layers.

5. The method of claim 1, wherein the DPS further includes a flag indicating the presence of an extension of the DPS.

6. The method of claim 1 wherein the DPS further includes a value indicating a number of layer descriptions.

7. The method of claim 1, wherein at least one of the layer descriptions includes a flag indicating that the layer depends, through inter-layer prediction, on another layer.

8. The method of claim 1, wherein a layer description pertaining to a first layer of the plurality of layers includes an identification of a second layer of the plurality of layers, and wherein the first layer depends on the second layer through inter-layer prediction.

9. The method of claim 1, wherein the layer descriptions comprise spatial layer descriptions.

10. The method of claim 7, wherein in at least two of the plurality of layer descriptions, the flag indicating that the layer depends, through inter-layer prediction, on another layer, indicates no inter-layer prediction.

11. The method of claim 9, wherein the layer description pertaining to a first layer of the plurality of layers includes information about at least a second layer of the plurality of layers which depends on the first layer.

12. The method of claim 11, wherein the first layer is a spatial layer, and the information is a number of quality layers of the plurality of layers depending on the spatial layer.

13. A method for video encoding, comprising:
   selecting a layering structure;
   encoding at least one Dependency Parameter Set (DPS) including a representation of the layering structure pertaining to a plurality of coded video sequences, wherein at least one of the plurality of coded video sequences is coded in a layered format;

wherein the representation of the layering structure comprises a plurality of layer descriptions corresponding to a plurality of layers, each layer description reference by an index;

sending at least one Network Abstraction Layer (NAL) unit including a layer_id value and belonging to a picture belonging to one of the least one of the plurality of coded video sequences;

wherein at least one inter-layer dependency of the NAL unit is determined based on the received DPS through accessing the layer description by using the layer_id as the index into the plurality of layer descriptions; and performing one of: including the encoded DPS in a bitstream, or sending the encoded DPS out of band;

wherein the DPS includes a dependency parameter set id, the dependency parameter set id being referred to from a sequence parameter set (SPS);

wherein the DPS comprises a raw byte sequence payload (RESP) separate from the SPS or SPS extensions, if any; and wherein the DPS is activated once in at least one of the plurality of coded video sequences and pertains to all pictures of the plurality of coded video sequences.

14. A system for video communications comprising:
a decoder configured to:
receive at least one Dependency Parameter Set (DPS) including a representation of a layering structure pertaining to a plurality of coded video sequences, wherein at least one of the plurality of coded video sequences is coded in a layered format;

wherein the representation of the layering structure comprises a plurality of layer descriptions corresponding to a plurality of layers, each layer description referencable by an index;

receiving at least one Network Abstraction Layer (NAL) unit including a layer_id value and belonging to a picture belonging to one of the least one of the plurality of coded video sequences;

decode the at least one DPS; and determining at least one inter-layer dependency of the NAL unit based on the received DPS through accessing the layer description by using the layer_id as the index into the plurality of layer descriptions;

wherein the DPS includes a dependency parameter set id, the dependency parameter set id being referred to from a sequence parameter set (SPS);

wherein the DPS comprises a raw byte sequence payload (RBSP) separate from the SPS or SPS extensions, if any; and wherein the DPS is activated once in at least one of the plurality of coded video sequences and pertains to all pictures of the plurality of coded video sequences.

15. A system for video communications, comprising:
an encoder configured to:
select a layering structure;
encode at least one Dependency Parameter Set (DPS) including a representation of the layering structure pertaining to a plurality of coded video sequences, wherein at least one of the plurality of coded video sequences is coded in a layered format;

wherein the representation of the layering structure comprises a plurality of layer descriptions corresponding to a plurality of layers, each layer description referencable by an index;

sending at least one Network Abstraction layer (NAL) unit including a layer_id value and belonging to a picture belonging to one of the least one of the plurality of coded video sequences;

wherein at least one inter-layer dependency of the NAL unit is determined based on the received DPS through accessing the layer description by using the layer_id as the index into the plurality of layer descriptions; and perform one of: including the encoded DPS in a bitstream, or sending the encoded DPS out of band;

wherein the DPS includes a dependency parameter set id, the dependency parameter set id being referred to from a sequence parameter set (SPS);

wherein the DPS comprises a raw byte sequence payload (RBSP) separate from the SPS or SPS extensions, if any; and wherein the DPS is activated once in at least one of the plurality of coded video sequences and pertains to all pictures of the plurality of coded video sequences.

16. A non-transitory computer readable medium comprising a set of instructions to direct a processor to perform the method of claim 1.

17. A non-transitory computer readable medium comprising a set of instructions to direct a processor to perform the method of claim 3.

18. A non-transitory computer readable medium comprising a set of instructions to direct a processor to perform the method of claim 7.

19. A non-transitory computer readable medium comprising a set of instructions to direct a processor to perform the method of claim 8.

20. A non-transitory computer readable medium comprising a set of instructions to direct a processor to perform the method of claim 9.

21. A non-transitory computer readable medium comprising a set of instructions to direct a processor to perform the method of claim 11.

22. A non-transitory computer readable medium comprising a set of instructions to direct a processor to perform the method of claim 12.

23. A non-transitory computer readable medium comprising a set of instructions to direct a processor to perform the method of claim 10.

24. A non-transitory computer readable medium comprising a set of instructions to direct a processor to perform the method of claim 13.

* * * * *